(No Model.)
T. H. JOHNSON.
SLIDE RULE.
No. 520,114.
Patented May 22, 1894.
Fig. 1.
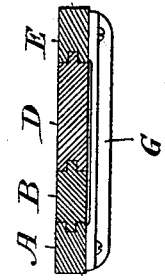
Fig. 4.
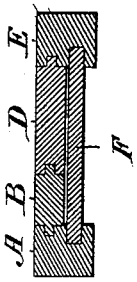
Fig. 5.
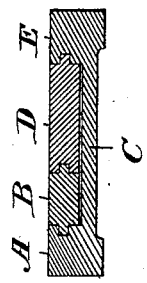
Fig. 6.
WITNESSES
John L. Ralph
C. M. Clarke
INVENTOR
Thomas H. Johnson (No Model.)  3 Sheets—Sheet 2.

T. H. JOHNSON.
SLIDE RULE.

No. 520,114.  Patented May 22, 1894.

$P = K - c \dfrac{l}{r}$   $K - c \dfrac{l}{r}$   $P = K - c \dfrac{12L\ 3.46}{h}$   $P = 8000 - 30 \dfrac{l}{r}$ (No Model.)

T. H. JOHNSON.
SLIDE RULE.

No. 520,114.    Patented May 22, 1894.

WITNESSES
John L. Ralph
C. M. Clarke

INVENTOR
Thomas H Johnson

UNITED STATES PATENT OFFICE.

THOMAS H. JOHNSON, OF PITTSBURG, PENNSYLVANIA.

SLIDE-RULE.

SPECIFICATION forming part of Letters Patent No. 520,114, dated May 22, 1894.

Application filed October 6, 1893. Serial No. 487,401. (No model.)

*To all whom it may concern:*

Be it known that I, THOMAS H. JOHNSON, a citizen of the United States, residing at Pittsburg, in the county of Allegheny and State of Pennsylvania, have invented or discovered a new and useful Improvement in Slide-Rules, of which the following is a full, clear, and exact description, reference being had to the accompanying drawings, forming part of this specification, in which—

Figures 2, 7, 8, 9, 10, 11, 12:
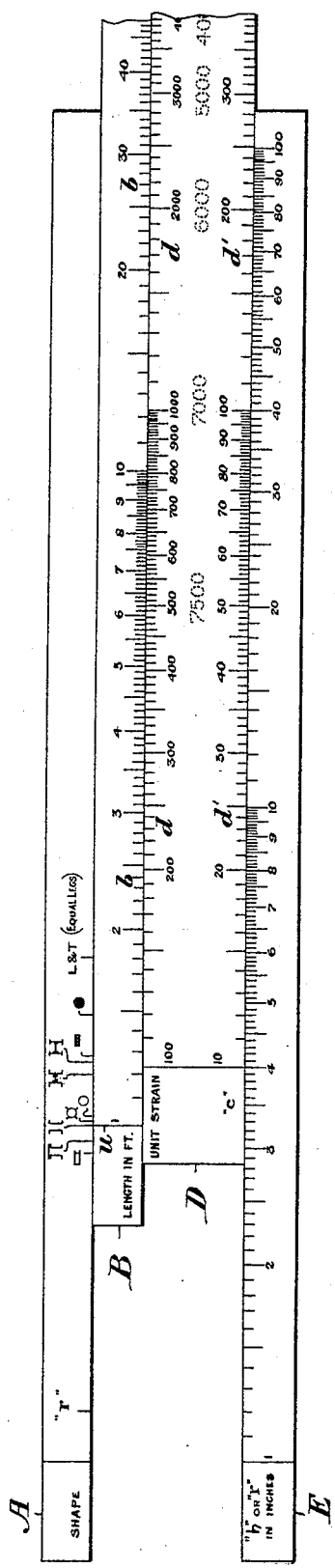
Figure 3:
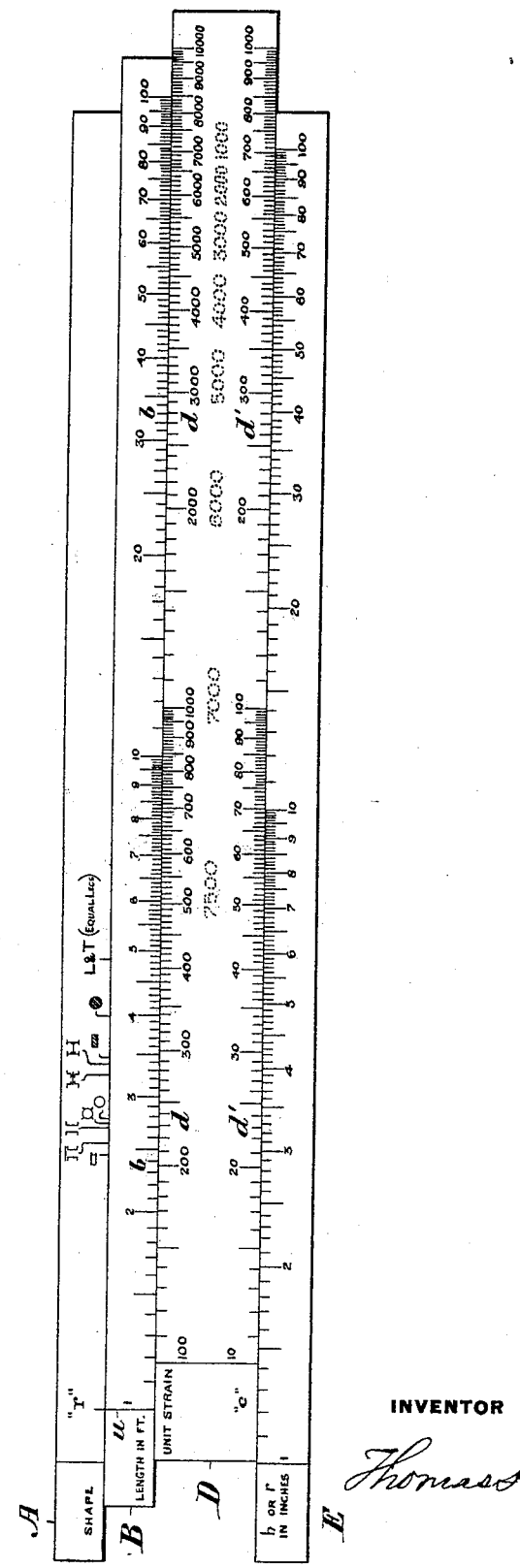

Figure 1, is a plan view of my improved slide rule, showing the slides closed. Fig. 2, is a similar view, but showing the slides set for reading the unit strain on a column composed of two twelve inch iron channels with pin ends and of any length. Fig. 3, is a similar view to Fig. 2, but showing the slides set for reading the unit strains for an iron column with pin ends and of any length and of any shape, whose least radius of gyration is 4.25 inches. Figs. 4, 5 and 6, are cross sectional views through the body of the rule, showing different manners of constructing the permanent or stationary frame thereof. Figs. 7, 8, 9 and 10, are representations of equations referred to hereinafter in the body of the specification. Figs. 11 and 12 are diagrammatic representations of sections used to designate forms of construction employed.

Like letters of reference refer to like parts wherever used throughout this specification.

My invention consists of an improvement in the construction of slide rules, reference being had particularly to that form known as "Gunter's slide rule," whereby I am enabled to adapt it to the solution of the equation shown in Fig. 7 of the drawings, as applied to the unit strains in columns.

The improvement consists of, first, the introduction of two sliding scales instead of one as heretofore used, whereby the application of the rule is extended to equations of five variables instead of three; second, marking upon the upper fixed scale, instead of the usual graduations of a scale of logarithms only those points corresponding to certain constants relating to the various forms of cross sections used for columns, posts and other compression members of bridges, buildings and other structures; third, in graduating all the other scales to logarithms of first powers only, instead of some for first powers, and some for squares as in the common slide rule.

In construction any mechanical device which holds the upper and lower scales A and E fixed in position, and allows the two intermediate scales B and D to slide freely, may be used. Three forms of construction are shown in section at Figs. 4, 5 and 6. In the first shown in Fig. 4, the two fixed scales and the back C, are all worked out of a solid piece. In the second, Fig. 5, the sides A and E, and the back F, are made separately, the back F having the grain running transversely, so as to diminish the effect of shrinkage, and fitting into grooves in the side pieces, and all glued together in the manner shown. In the third method, Fig. 6, the sides are made separately and connected by two or more metallic cleats G, screwed to the backs of the side pieces A and E. It will also be understood that any other convenient manner of securing the side pieces may be employed, so that they shall be maintained in a rigid, unyielding position with reference to the slides.

The slide rule thus completed will show upon its upper face, first, a fixed scale A, with graduation marks at certain points corresponding to the constants for different forms of cross section, as hereinafter explained. Second, a sliding scale B graduated on its lower edge to a scale of the logarithms of natural numbers, $b$, marked with numbers from 1 to 100 corresponding to the length of the column in feet. The upper edge is not graduated except only the unit mark $u$, which extends across the face of the slide. Third, a sliding scale D graduated to a scale of logarithms on both edges, and marked on the upper edge with numbers from 100 to 10,000 as at $d$, and on the lower edge from 10 to 1,000 as at $d'$. Fourth, a fixed scale E graduated on its upper edge to a scale of logarithms, and marked with numbers from 1 to 100.

The graduation of the fixed scale A is determined as follows:—In the expression shown in Fig. 8, $l$ represents the length of column in inches, $r$, the radius of gyration of the section also in inches, and $c$ is a numerical factor having special values for each material and form of end bearing; K is a factor depending on the kind of material.

In practice the length of a column is usually expressed in feet, and fractions of a foot, and one item of calculation will be saved by changing the formula and making the slide rule to use the length in feet instead of inches. If L equals length in feet, then $l$ equals twelve L, and the point $r$ is marked at the point corresponding to the logarithm of twelve.

For the different shapes commonly in use the ratio of the radius of gyration to the breadth of the section is nearly constant for each particular shape. Thus for a solid rectangle or square, if the side of the rectangle is called $h$, then $r=\dfrac{h}{3.46}$ and the equation for a column of that section becomes that shown in Fig. 9, and the upper scale is marked at the point corresponding to the logarithm of $(12\times3.46)=\log.$ 41.52 and marked with the symbol shown in Fig. 11, to designate a solid rectangle. For a hollow rectangle $r=\dfrac{h}{2.45}$ and the scale is marked at the point corresponding to the logarithm $(12\times2.45)$ and marked with the symbol shown in Fig. 12, to designate a hollow rectangle. Similarly for other shapes in which the ratios of $r$ to $h$ are approximately constant, the scale is marked at the point corresponding to the logarithm of twelve times the ratio for each shape, and each point marked with a suitable symbol to designate the shape to which it belongs.

To illustrate the use of the slide rule when so made, it may be supposed that it is desired to find the safe load per square inch upon a column twenty feet long, composed of two channels twelve inches deep, and that the specification requires the unit strain to be determined by the formula shown in Fig. 10. Then in Fig. 2, set the unit point $u$ of the slide B to the mark on the fixed scale A designated ⏋⏌. Find 30 on scale "$c$" designated on the drawing by $d'$, and set it opposite to 12 on scale E. Then on the scale of "length" find 20, and opposite it read 1620, which is the value of the minus quantity $30\dfrac{l}{r}$. The required unit strain will then be eight thousand minus sixteen hundred and twenty equals six thousand three hundred and eighty pounds per square inch. If the length of the column were thirty feet instead of twenty, then with the same setting of the slides opposite 30 we read 2420, and the required unit strain will be eight thousand minus two thousand four hundred and twenty equals five thousand five hundred and eighty pounds per square inch. In the same manner, the unit strain may be found for any other length of column of that breadth and shape, at the one setting of the slides.

The arithmetical work of making the subtraction may be avoided, for the assumed equation, if we graduate the scale of "unit strains" in the reverse order, beginning with zero at the point marked 8,000 and numbering from right to left as indicated by the dotted figures. We would then read the result direct from the scale, for twenty feet, six thousand three hundred and eighty pounds, for thirty feet, five thousand five hundred and eighty pounds, and so on for any other length. To facilitate this adaptation of the scale to the various values of K, given in diverse specifications for structural work, the slide D may be made with an unpolished surface on which the reverse numbering can be readily marked in pencil, and afterward erased. Or if desired, this reverse numbering for any special value of K, may be permanently stamped on the slide. The former method is preferable for general use, and the latter for special use where much work is done under a particular formula.

For any shape of section not designated on the scale A, the radius of gyration having been computed, the mode of procedure will be as illustrated in Figs. 3, in which it is assumed that the unit strain is required for a column whose section has a radius of gyration of 4.25 inches, the formula specified being as before, as shown at Fig. 10. The unit point on scale of "length" is set to the point marked "$r$" on the fixed scale and 30 on the scale "$c$" designated by $d'$, is set to 4.25 on scale of "$h$" or "$r$." Then for twenty feet length the unit strain will be eight thousand minus sixteen hundred and ninety equals six thousand three hundred and ten, or for thirty feet eight thousand minus two thousand five hundred and thirty equals five thousand four hundred and seventy, and similarly for any other length.

The advantages of my invention will be appreciated by those accustomed to the use of a slide rule for the computation of unit strains in columns, and for the solution of other equations to which it is applied.

Variations in the inscriptions on the face of the scale A may be made to adapt it to the requirements of additional shapes, and to enable the rule to be applied to other special calculations as occasion may require.

Having described my invention, what I claim, and desire to secure by Letters Patent, is—

1. In a slide rule for computing unit strains in columns, the combination of two rigid side pieces A. and E., braced at the back, with two slides B. and D. provided with tongues, interfitting and arranged to slide in the side pieces; the side pieces and slides bearing logarithmic inscriptions and diagrams, and one of the slides, D, being provided with an unpolished surface for part of its width, adapted to receive pencil marks and to permit of their erasure, substantially as shown and described.

2. A slide rule for computing unit strains in columns, comprising a fixed scale A. with graduation marks at certain points corresponding to the constants for different forms of cross section, a sliding scale B. graduated on its lower edge to a scale of the logarithms of natural numbers, marked with numbers from 1 to 100 corresponding to the length of the column in feet, a sliding scale D. graduated to a scale of logarithms, on both edges and marked on the upper edge with numbers from 100 to 10,000, and on the lower edge from 10 to 1,000, a fixed scale E. graduated on its upper edge to a scale of logarithms and marked with numbers from 1 to 100, substantially as shown and described.

In testimony whereof I have hereunto set my hand this 26th day of August, 1893.

THOMAS H. JOHNSON.

Witnesses:
JOHN L. RALPH,
C. M. CLARKE.